US012754102B2

(12) United States Patent
Beam et al.

(10) Patent No.: US 12,754,102 B2
(45) Date of Patent: Oct. 6, 2026

(54) VALVE EVENT MONITORING SENSOR

(71) Applicant: Resonance Systems, Inc., Knoxville, TN (US)

(72) Inventors: Richard Paul Beam, Knoxville, TN (US); Edward B. Flanagan, Knoxville, TN (US)

(73) Assignee: Resonance Systems, Inc., Knoxville, TN (US)

( * ) Notice: Subject to any disclaimer, the term of this patent is extended or adjusted under 35 U.S.C. 154(b) by 342 days.

(21) Appl. No.: 18/411,922

(22) Filed: Jan. 12, 2024

(65) Prior Publication Data

US 2024/0280437 A1 Aug. 22, 2024

Related U.S. Application Data

(60) Provisional application No. 63/485,997, filed on Feb. 20, 2023.

(51) Int. Cl.

*G01H 1/00* (2006.01)
*G01M 15/02* (2006.01)
*G01M 15/12* (2006.01)

(52) U.S. Cl.

CPC .............. *G01M 15/02* (2013.01); *G01H 1/00* (2013.01); *G01M 15/12* (2013.01)

(58) Field of Classification Search

CPC .............................. G01M 15/02; G01M 15/12
See application file for complete search history.

(56) References Cited

U.S. PATENT DOCUMENTS 5,454,269 A 10/1995 Vogt
8,245,576 B2 8/2012 Komninos
10,732,150 B2 8/2020 Flanagan
2004/0139803 A1* 7/2004 Robinson ............... G01H 11/06 73/650
2008/0307637 A1 12/2008 Fogarty et al.
2015/0241463 A1* 8/2015 Kraige .................... G01P 15/09 73/514.29
2016/0153443 A1* 6/2016 Glass ...................... F04B 51/00 417/63
2019/0072525 A1* 3/2019 Flanagan ............ G01N 29/265

FOREIGN PATENT DOCUMENTS

WO WO-2013135273 A1 * 9/2013 ............ G01H 11/06

* cited by examiner

*Primary Examiner* — Herbert K Roberts
(74) *Attorney, Agent, or Firm* — Merchant & Gould P.C.

(57) ABSTRACT

An event monitoring sensor apparatus for detecting vibration signals emitted from a machine. In one aspect, the apparatus includes a housing, an inner chamber within the housing, a sensor at a first position of the inner chamber, and an electrical connection that electrically connects to the sensor. The apparatus further includes an attachment mechanism at least partially enclosed within the inner chamber and located at a second position of the inner chamber. In some examples, the attachment mechanism is removably attachable to a machine to seal the inner chamber from external noise.

10 Claims, 13 Drawing Sheets

VALVE EVENT MONITORING SENSOR

CROSS-REFERENCE TO RELATED APPLICATION

This application claims priority to U.S. Provisional Application No. 63/485,997, filed Feb. 20, 2023, the disclosure of which is hereby incorporated by reference in its entirety.

BACKGROUND

In the field of machine condition monitoring, several sensors and techniques are employed to determine the mechanical health of a machine while it is operating. Determining machine health is analogous to a doctor examining a human patient with a stethoscope, Xray, MRI, or other equipment and tests to determine whether the patient is healthy or not. A physician's stethoscope could be compared to a condition monitoring analyst's machine analyzer, and the larger fixed medical equipment can be compared to machine online systems which are fixed to a machine and provide continuous monitoring.

A reciprocating machine is a machine with a piston that moves back and forth in a regular predictable motion. These machines are typically internal combustion engines and piston compressors employed in heavy industry like oil refining and natural gas production and transmission. These machines are typically part of a critical infrastructure where mechanical failure is expensive or even catastrophic.

Some older reciprocating engines and most compressors provide access to monitor pressure within the piston cylinder. In cylinder pressure monitoring is critical to determining cylinder valve and piston ring condition. Techniques and sensors for proper analysis of in cylinder pressure have long been established and published by entities such as Gas Research Institute.

Many modern smaller reciprocating engines do not provide access to in cylinder monitoring, so other sensors and techniques need to be developed to determine the health of these machines. As industry infrastructure is modernized, more and more of these machines without pressure monitoring are being deployed, yet the need to determine cylinder valve health in particular remains.

One of the portable tools often employed by a condition monitoring analyst is an ultrasonic sensor. This sensor is sensitive to sound pressure data in the 40 KHz-44 KHz range. It is established that gas movement in a pipe or the opening and closing of cylinder valves provide sound waves in this ultrasonic frequency range which can be detected by an appropriate sensor, and analyzed with the proper technique.

It is less common to use permanently attached ultrasonic sensors in an online system, but solutions have been proposed such as U.S. Pat. No. 10,732,150, the disclosure of which is fully incorporated herein as far as it is consistent with this disclosure. The sensor disclosed in U.S. Pat. No. 10,732,150 is able to be removably attached to an object of interest and seals the probe cavity using a boundary seal. However, boundary seals can be difficult to include in the design and expensive to manufacture.

What is needed is an improved ultrasonic sensor most applicable to online systems.

It is with respect to these and other general considerations that embodiments have been described.

SUMMARY

In accordance with the present disclosure, the above and other issues are addressed by the following:

In a first aspect, a sensing apparatus for detecting ultrasonic waves from a vibration-generating machine comprises a housing, an inner chamber within the housing, a sensor at a first position of the inner chamber. The sensor detects ultrasonic waves and converts the ultrasonic waves to electrical signals. The apparatus further comprises an electrical connection that electrically connects to the sensor and outputs the electrical signals from the sensor, and an attachment mechanism at least partially enclosed within the inner chamber and located at a second position of the inner chamber. The attachment mechanism is removably attachable to a machine to seal the inner chamber from external noise.

In a second aspect, a method for detecting ultrasonic waves from a machine comprises communicatively connecting a display device to a connection port of a detection device, attaching the detection device to a machine by an attachment mechanism at least partially enclosed within an inner chamber of the detection device. The attachment mechanism seals the inner chamber. The method also includes detecting, by a sensor within the inner chamber of the detection device, ultrasonic waves from the machine, and outputting the ultrasonic waves to the display device.

In a third aspect, a system for machine diagnostics comprises a machine with an engine that causes the machine to vibrate, a sensing apparatus attached to the machine, the sensing apparatus comprising a housing. The apparatus further comprises an inner chamber within the housing, a sensor at a first position of the inner chamber. The sensor detects ultrasonic waves and converts the detected ultrasonic waves to electrical signals, an electrical connection. The electrical connection electrically connects to the sensor and outputs the electrical signals, and an attachment mechanism at least partially enclosed within the inner chamber and located at a second position of the inner chamber. The attachment mechanism is removably attachable to the machine to seal the inner chamber from external noise.

BRIEF DESCRIPTION OF THE DRAWINGS

Non-limiting and non-exhaustive examples are described with reference to the following figures.

DETAILED DESCRIPTION

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

As briefly described above, embodiments of the present disclosure are directed to an event monitoring sensor. The described device can removably attach to a mechanical machine of interest and accurately obtain ultrasonic waves emitted from the machine vibrations. These waves can be analyzed to determine possible malfunctions within the desired machine. In order to attach to the machine, the device includes an attachment mechanism that allows the event monitoring apparatus to attach and cause a seal to form between the device's inner chamber and external sound. The seal shields the inner chamber of the event monitoring apparatus from external noise, thus, allowing the event monitoring apparatus to measure ultrasonic waves without also measuring outer acoustic noise. As the machine operates, the vibrations from the engine cause the machine to vibrate, which in turn causes the surrounding air to vibrate in the form of ultrasonic waves. Waves within the inner chamber of the event monitoring apparatus can be analyzed by a sensor also within the chamber. The sensor converts the ultrasonic waves into electrical signals.

Further, the system can output obtained waveforms of the vibrations of the machine to a display based on the converted electrical signals. Waveforms often have information that signal the health of a machine. By analyzing the amount of energy within the earlier band section and late band section of an event indicated in the waveform, it can be determined if an error or malfunction has occurred such as a misfire or other abnormal condition.

Figure 1:
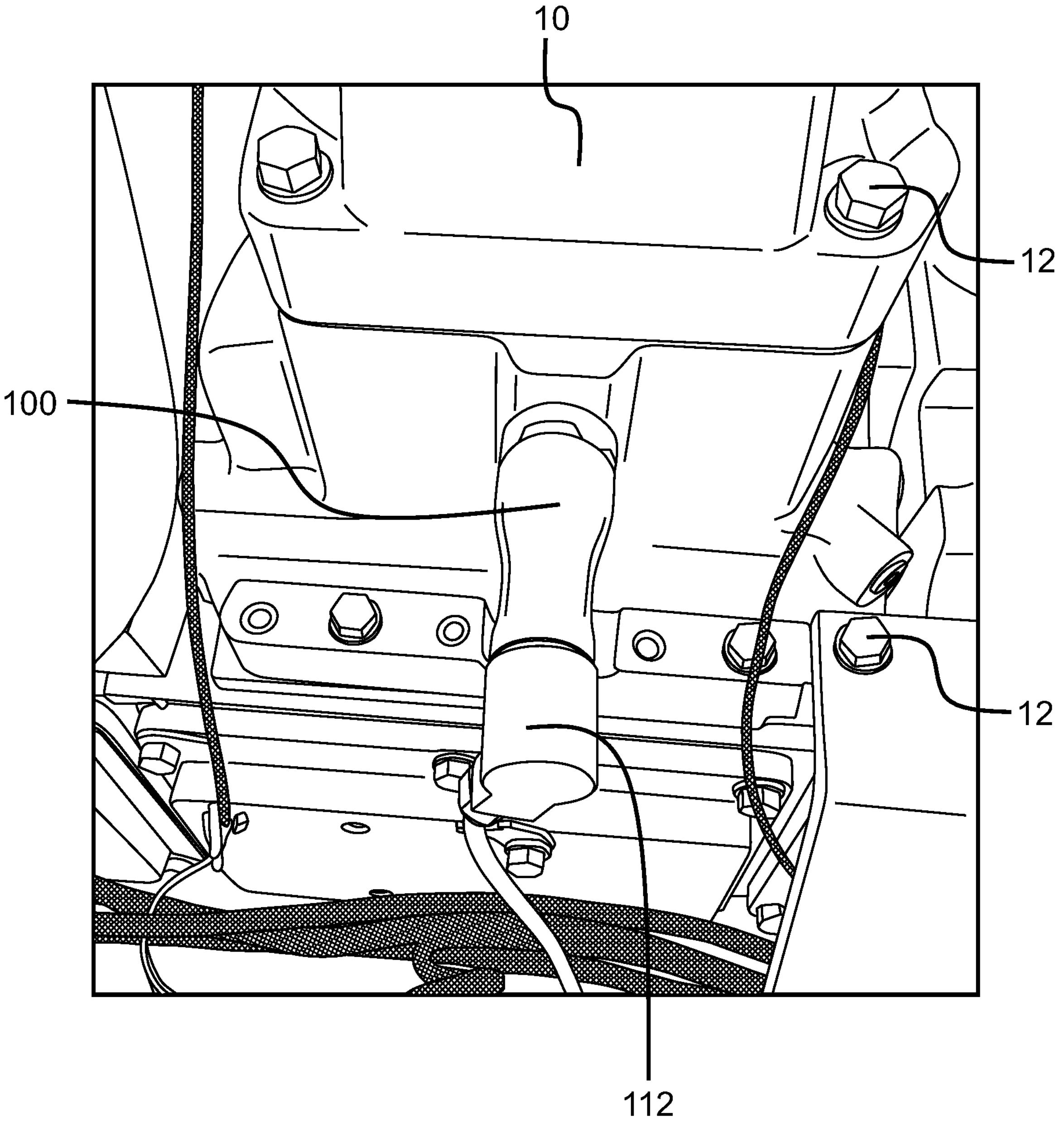
FIG. 1 illustrates an example environment for using an event monitoring apparatus to detect possible malfunctions in a machine of interest.
Figure 2:
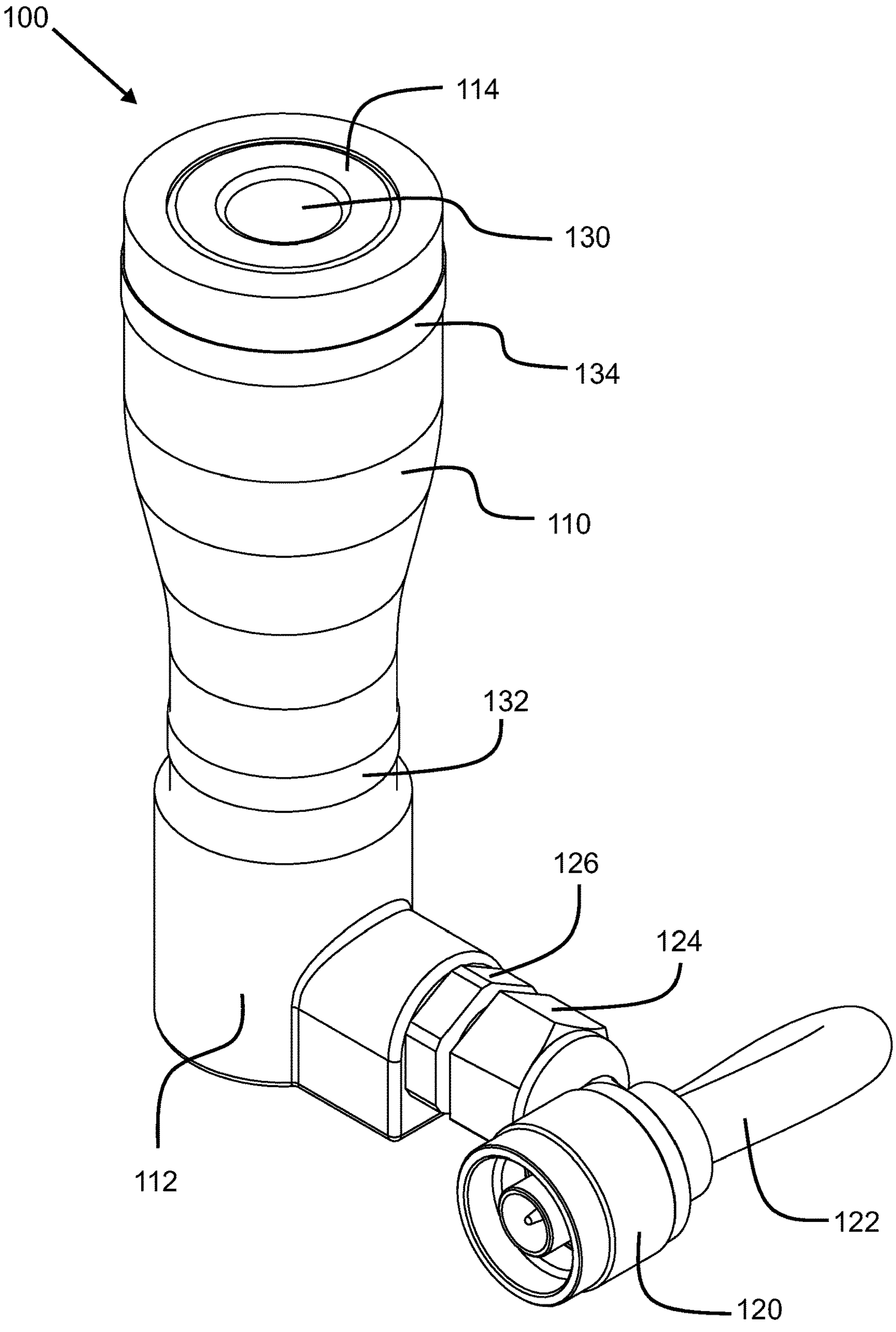
FIG. 2 illustrates an example top perspective view of the event monitoring sensor of FIG. 1.
Figure 3:
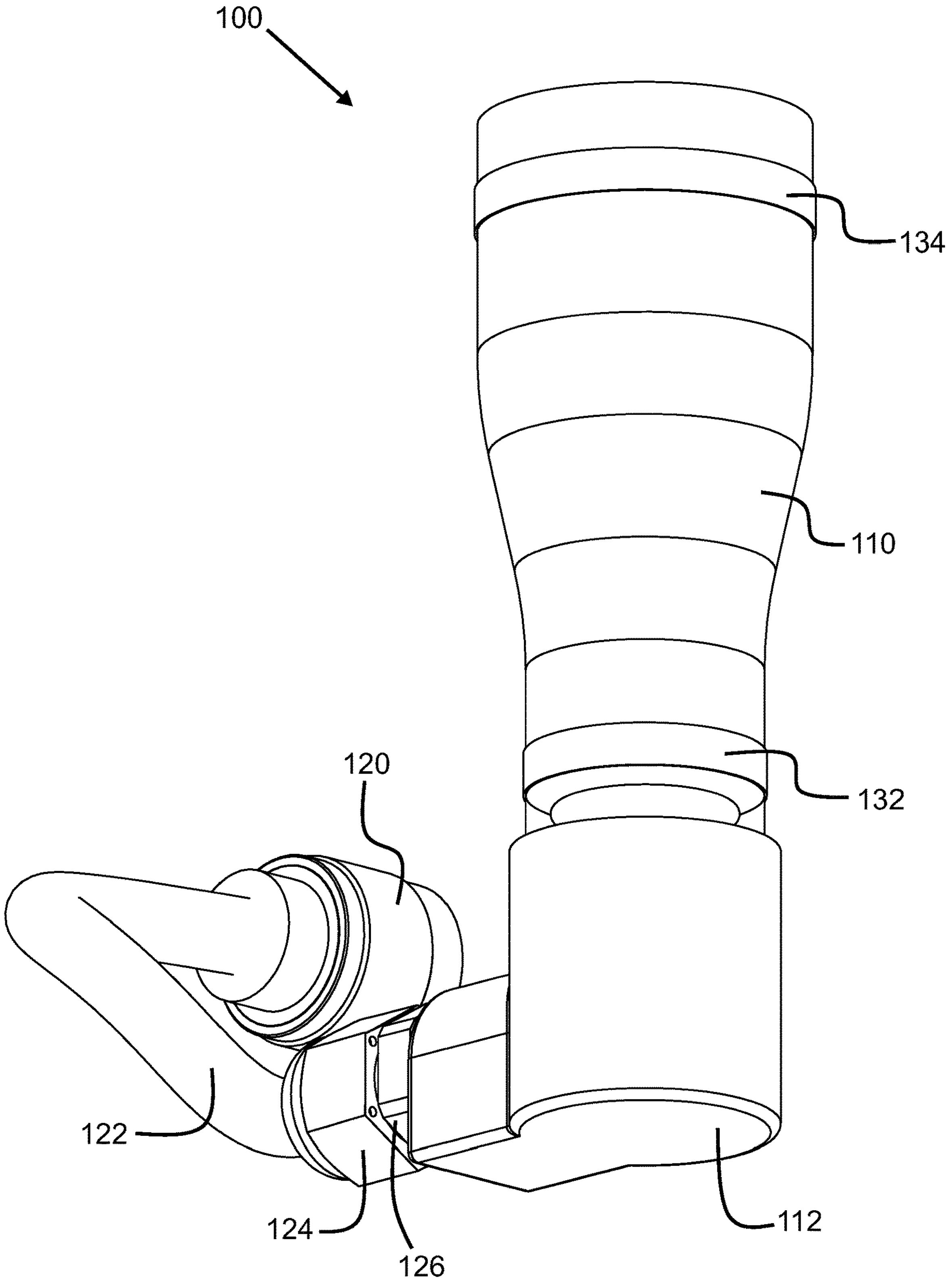
FIG. 3 illustrates an example bottom perspective view of the event monitoring sensor of FIG. 1.

FIG. 1 illustrates an example environment for using an event monitoring sensor to detect possible malfunctions in a machine of interest. In the shown embodiment, machine 10 includes a plurality of bolts 12. The machine 10 may be any type of machine that includes a reciprocating engine with pistons that cause the machine 10 to vibrate. Due to these vibrations occurring at all times the machine is operating; the vibrations can be monitored for machine health at any time the machine is being used. The event monitoring apparatus 100 is configured to attach to a position on the machine 10 and detect the vibrations caused by the engine. In one example, the event monitoring apparatus 100 attaches to one of bolts 12. Further, bolts 12 may include any number of the illustrated bolts. In other examples, event monitoring apparatus 100 may attach to a flat surface of the machine 10 or a different protrusion. Through the attachment, the event monitoring apparatus 100 detects the vibrations from the machine 10 and display waveforms of the vibrations. The vibration waveforms, as discussed below, can be used to determine the overall health of the machine 10.

Figure 7:
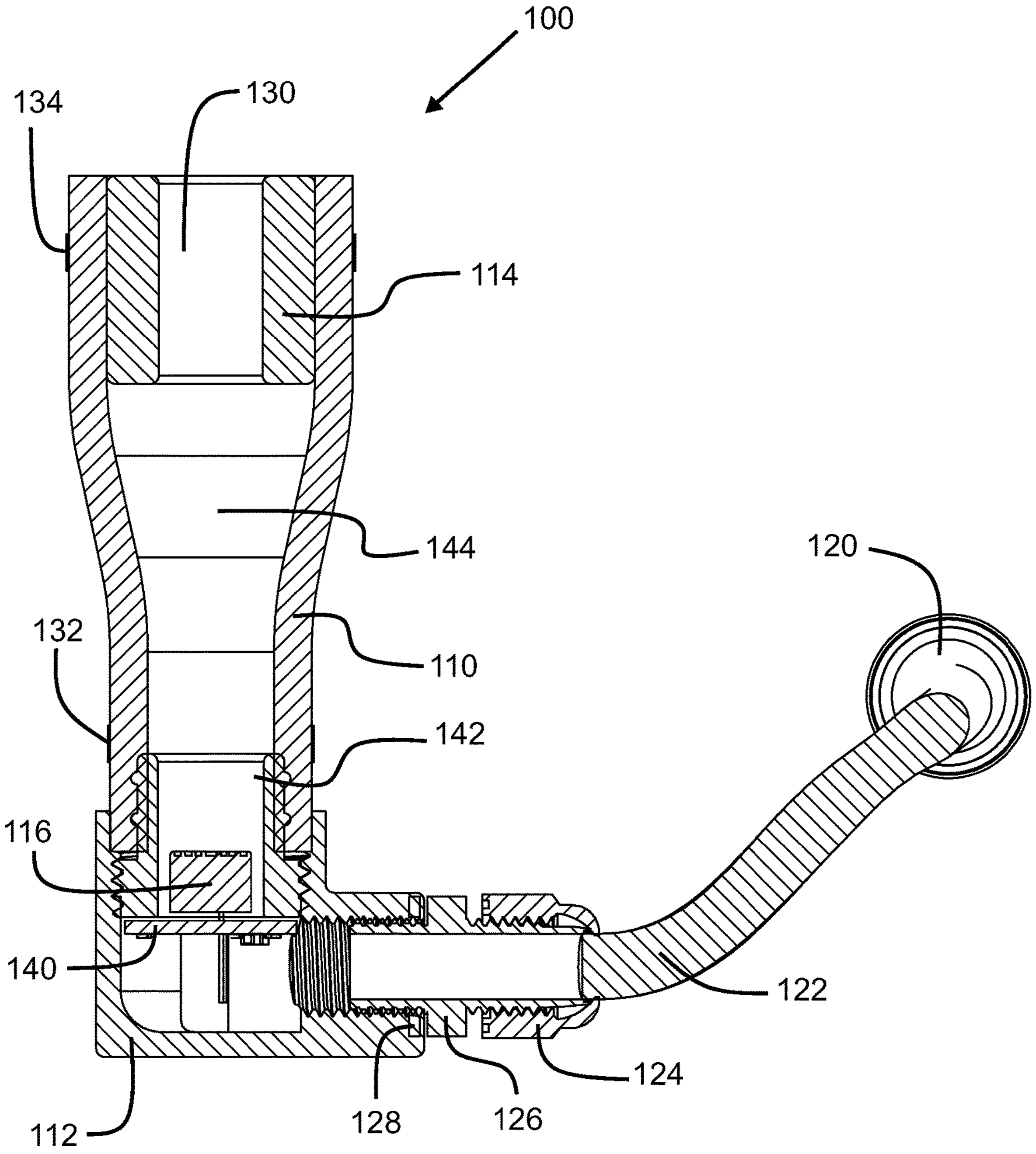
FIG. 7 illustrates an example cross-sectional view of the event monitoring sensor of FIG. 1.
Figure 8:
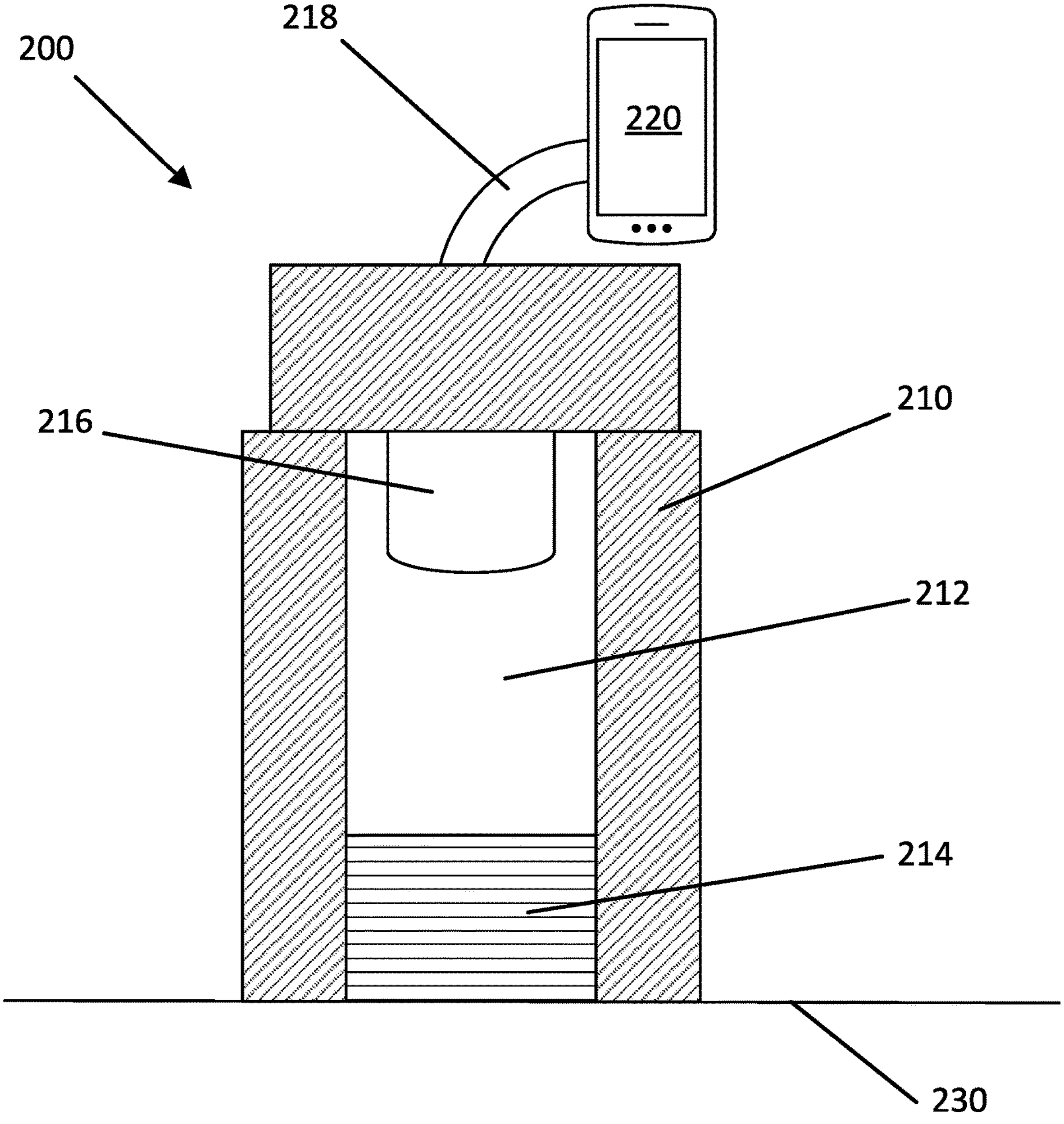
FIG. 8 illustrates an alternative example of the attachment mechanism of the event monitoring sensor of FIG. 1.

Referring to FIGS. 2, 3, 4, 5, 6, and 7, an example embodiment of an event monitoring apparatus shown in FIG. 1 is described. The event monitoring apparatus 100 includes outer housing 110 that defines an inner chamber 144. Attachment mechanism 114 resides within the inner chamber 144 at a first position while a sensor 116 resides at least partially within the inner chamber 144 at a second, opposite position. A component housing 112 is shown as being connected and attached to the outer housing 110. In the shown aspect, the sensor 116 is secured to a printed circuit board (PCB) 140 within the pipe nipple 142 that sits between the outer housing 110 and the component housing 112. The PCB 140 further includes holes 146 that receive screws to secure the PCB board 140 to the pipe nipple 142. Screws can be inserted into the holes 146 and screwed into corresponding holes within pipe nipple 142. In FIG. 7, the pipe nipple 142 is shown as overlapping with outer housing 110. However, the outer housing 110 conforms about the outer surfaces of the pipe nipple 142 in the shown embodiment. The pipe nipple 142 acts as an adapter that allows the component housing 112 to connect and seal the sensor 116 within inner chamber 144. The component housing 112 further defines a path for electrical connections to extend from to the PCB 140 through cable gland 128 and domed nut 124. These connections may be small wires to increase the wires' resistance to noise from the external environment or the machine shaking. The sensor 116 is configured to transmit the detected ultrasonic waves through this connection to a device connected to connection port 120. These components allow the event monitoring apparatus 100 to removably attach to a machine of interest, such as machine 10, and monitor its health and observe error or malfunction events.

Outer housing 110 protects the inner components of event monitoring apparatus 100. In one embodiment, outer housing 110 is made of a polymeric material, such as a silicone rubber. In the shown embodiment, the outer housing 110 construction and material allow for ultrasonic waves to travel from the first position of inner chamber 144 to the opposite position where sensor 116 resides. In the shown embodiment, the inner chamber 144 is 3" in length and has a circumference of 1.5" or more at the end including the attachment mechanism. However, other embodiments can include different dimensions for the chamber. Similar results may be achieved using a longer length for the inner chamber 144. Further, the inner chamber 144 is tapered to decrease in diameter as shown. Additional embodiments may include a consistent diameter throughout the whole inner chamber 144. The pipe nipple 142 connecting the component housing 112 and the inner chamber 144 may be secured by a stainless steel (SS) band that squeezes the components to prevent separation. As an example, this embodiment includes the SS band 132 compressing the portion of the outer housing 110 including a section of pipe nipple 142 to prevent component housing 112 from detaching from the outer housing 110. Some embodiments may include placing the SS band around the portion of component housing 112 that couples to the outer housing 110 to prevent removal. Other embodiments may include compressing the outer housing 110 between the pipe nipple 142 and the component housing 112 to further secure the outer housing 110. Moreover, SS band 134 wraps around the wider portion of outer housing 110, which includes the attachment mechanism 114. Wrapping the SS band at this location prevents the attachment mechanism 114 from separating from inner chamber 144. In additional embodiments, fasteners, adhesive, glue, clips, or other securement techniques may be used. Moreover, locating the sensor 116 at the opposite position of inner chamber 144 from the attachment mechanism 114 may decrease the detected noise from the external environment. Further, the illustrated shape of inner chamber 144 generally directs the produced ultrasonic waves towards the sensor 116. This location for the sensor also limits the exposure of the cables within the event monitoring apparatus 100. In other embodiments, the sensor can extend down into the inner chamber 144 from the component housing 112.

In this embodiment, outer housing 110 formed from silicone rubber offers minimal interference within the inner chamber 144 so that sensor 116 will accurately capture ultrasonic waves emitted by a machine that a user wishes to observe. In addition, silicone rubber, and other similarly soft and flexible materials, will insulate or shield the inner chamber 144 from outside noise that may cause sensor 116 to produce inaccurate readings. Silicone rubber also offers enhanced durability since the environment surrounding the machine will expose the event monitoring apparatus 100 to heat produced from the machine 10 and dust that has been stirred from the vibrations of the machine.

In another embodiment, a more rigid material with an inner pattern design is used. For example, the material may be a rigid polymeric material, such as rigid HDPE and polypropylene materials, or other types of rigid materials. 3D printing material may also be used. In embodiment with a rigid material for the outer housing 110, the inner surface of outer housing 110 includes a pattern designs. In one example, the inner surface of outer housing 110 may be a honeycomb pattern, thus resulting in a honeycomb internal structure. Using a different pattern as opposed to a solid surface prevents the transmission of noise from the surrounding environment, thus, shielding the sensor from external noise. In still further embodiments, the inner surface of outer housing 110 is made of a different material than the rest of outer housing 110. For example, a coating is applied to help with wave transmission in inner chamber 144 and insulation.

Figure 9:
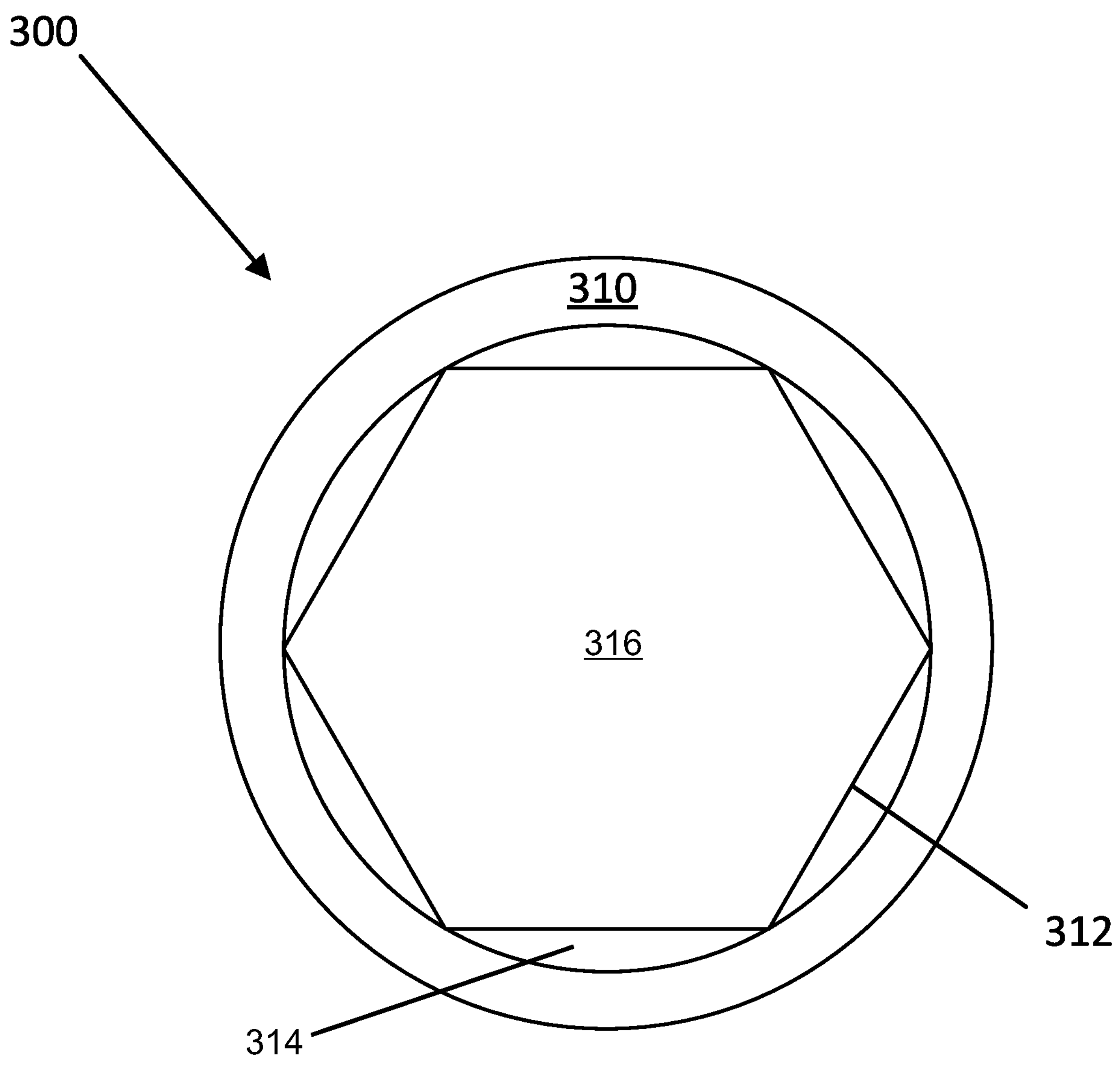
FIG. 9 illustrates an alternative example of an event monitoring sensor with an alternative opening in the attachment mechanism.

Attachment mechanism 114 allows for event monitoring apparatus 100 to removably connect/attach to the surface of a desired machine. In the shown embodiment, attachment mechanism 114 is fully enclosed by outer housing 110. Placing attachment mechanism 114 within outer housing 110 creates an acoustic seal between the inner chamber 144 and the external environment. In other embodiments, attachment mechanism 114 is only partially enclosed within outer housing 110, but attachment mechanism 114 still forms a seal while attached to the surface of a machine. In one embodiment, attachment mechanism 114 is a magnet, such as a rare earth magnet, with an opening 130. Opening 130 allows for ultrasonic waves to travel through inner chamber 144 to sensor 116 without having to pass through the attachment mechanism 114, however, removing opening 130 still allows for ultrasonic waves to reach the sensor due to the attachment mechanism 114 vibrating with the machine as shown in FIG. 9. Opening 130 additionally allows the event monitoring apparatus 100 to attach to a bolt such as one of bolts 12. The opening 130 will encompass the bolt 12 and magnetically seal to either the machine surface or washer beneath bolt 12. In this embodiment, once attachment mechanism 114 magnetically connects to the surface of a machine or protruding bolt, the connection creates a seal between inner chamber 144 and the external environment since opening 130 is now covered by the machine surface or a washer beneath a bolt. This seal prevents external air or acoustic waves from entering the inner chamber 144 during use. The opening 130 may be configured to encompass additional types of protrusions of the machine, such as a screw or nut. Further, the attachment mechanism includes an outer diameter of 1", an inner diameter of ½", and a length of 1" in this embodiment. While these dimensions are provided for the shown embodiment, other embodiments may use different dimensions as well.

In still other embodiments, attachment mechanism 114 includes a threaded attachment end that can connect to another part protruding from a machine of interest. The part may be the male side of a bolt, nut, or screw. Further, the threaded/fitted attachment end may include a female attachment end that receives the corresponding male end. The threads allow event monitoring apparatus 100 to be screwed onto a portion of the desired machine and to create a seal between inner chamber 144 and the external environment. Further, the threaded or bolt fitted design may already create a seal within inner chamber 144. Thus, when attached to a machine, the device becomes one with the machine and the ultrasonic waves travel through attachment mechanism 114 before reaching the sensor 116. Other means for attaching event monitoring apparatus 100 can be appreciated as well from this disclosure.

In the illustrated aspect, sensor 116 forms a piezoelectric crystal transducer. This transducer can detect acoustic sound waves, such as ultrasonic waves, and convert these waves into electrical signals. The changes in pressure surrounding the transducer cause it to produce an electrical signal that corresponds to the detected acoustic waves. In other embodiments, sensor 116 includes other types of transducers including capacitive transducers and electromagnetic acoustic transducers.

In the shown embodiment, sensor 116 then electrically connects to PCB 140, which then electrically connects to connection port 120. In one embodiment, the connection port 120 includes an integrated circuit piezoelectric (ICP) connection that extends through the insulation tubing 122. This type of connection or interface allows for common accelerometers to connect with event monitoring apparatus 100 and replace the ultrasonic sensor. Further, the ICP interface allows two wires to conduct both power and analog data in a fashion that is safe for use in hazardous area environments. The connection 120 also may include two wires for an output signal. Other multi-pin connectors can be used as well for other embodiments. Additional uses of the ICP interface allow the event monitoring apparatus 100 to connect sensor 116 through connection port 120 to legacy systems that normally require an accelerometer instead of an ultrasonic sensor. In different embodiments, connection port 120 includes a charge mode or voltage mode connection. In still other embodiments, connection port 120 is a Universal Serial Bus (USB) connection that can transfer digital data. Using USB may allow event monitoring apparatus 100 to transfer digital data and connect to any computing device such as a smart phone, tablet, or laptop. In still other embodiments, connection port 120 may use wireless communication protocols such as Wi-Fi, 802.11, Bluetooth, Near-Field-Communications, or other methods to wirelessly connect devices. Additional embodiments may include hard wiring to connect to a separate device that receives signals outputted from sensor 116.

Additional embodiments may include using a coaxial cable and its inner conductor to connect the sensor 116 to its output through component housing 112. In some embodiments, event monitoring apparatus 100 may also include a small wire, which may be in a small coil that encircles electrical wires within component housing 112, cable gland 128, domed nut 124, and insulation tubing 122 to keep noise from the electrical cable within and traversing to the sensor 116. Thus, the small wire acts like a dampener or isolator.

The use of a tiny wire between the cable and the PCB 140 may add these benefits of attenuating external noise and isolate sensor 116.

FIG. 9 illustrates an alternative example of an event monitoring sensor with an alternative opening in the attachment mechanism. In this embodiment, event monitoring system 200 includes outer housing 210 surrounding inner chamber 212. Within inner chamber 212 resides magnet 214 on one end and sensor 216 on the opposite end. Sensor 216 uses connection port 218 to send electrical signals to device 220. Further, magnet 214 is attached directly to machine surface 230. Thus, event monitoring system 200 allows a user to use the system to monitor a machine of interest to determine its health or operability.

In one embodiment, outer housing 210 is the same as outer housing 110. In another embodiment, outer housing 210 has a different shape. For example, it includes a circumference that is the same throughout its entire length. Other designs include cylindrical or a rectangular prism. Additionally, inner chamber 212 is the same as inner chamber 144 in one embodiment except that the inner chamber 212 has a consistent volume that does not taper at one end. Inner chamber 212 can take many different forms that allow magnet 214 to attach to a surface and sensor 216 to detect transmitted ultrasonic waves from the machine.

In the shown embodiment, magnet 214 magnetically attaches to machine surface 230. Rather than including an opening similar to opening 130, magnet 214 is solid. Magnet 214 is attached to machine surface 230 so that magnet 214 essentially becomes one with machine surface 230. Thus, ultrasonic waves pass through magnet 214 and are accurately detected by sensor 216. In one embodiment, machine surface 230 is the surface of a reciprocating machine 10. In this embodiment, machine surface 230 is ferromagnetic, and magnet 214 can attach to any ferromagnetic part of the machine.

Figure 4:
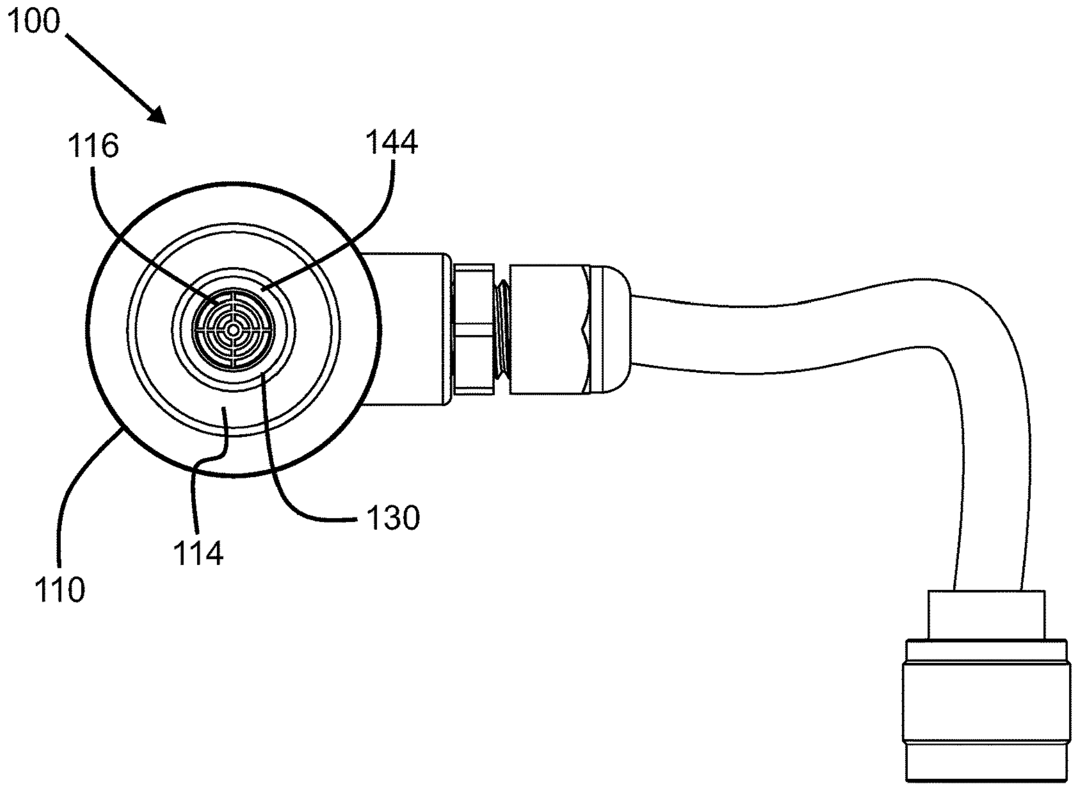
FIG. 4 illustrates an example top view of the event monitoring sensor of FIG. 1.

In the shown embodiment, sensor 216 is the same as sensor 116. However, sensor 216 may differ in the ways previously described. In this embodiment, sensor 216 then uses connection port 218 to connect to device 220. Connection port 218 may be the same as connection port 120. In this embodiment, connection port 218 allows sensor 216 to electrically or communicatively connect to device 220. In other embodiments, it is a different type of connection. Further, sensor 216 and connection port 218 may include circuitry as shown in FIG. 4 and discussed below.

Additionally, the shown embodiment of event monitoring system 200 includes device 220. In this embodiment, device 220 is a standard computing device that can receive electrical signals and display the data to a user. Additionally, the device 220 may include a multiplexer or switch to connect multiple event monitoring apparatus 100 and obtain multiple signals from the machine of interest. In still other embodiments, device 220 is any kind of device that can receive electrical signals that represent acoustic waves or ultrasonic waves and display them in a human readable format.

FIG. 9 illustrates an example perspective view of an alternative embodiment of a valve event monitoring sensor. Event monitoring apparatus 300 includes outer housing 310 and opening 312. In this alternative embodiment, opening 312 is in the shape of a bolt to connect to a protruding bolt on a machine. In the shown embodiment, attachment mechanism 314 is a magnet that holds event monitoring apparatus 300 to the bolt of the machine while it measures the signals. Further, opening 312 creates a seal within the inner chamber 316 of event monitoring apparatus 300 by fitting around a bolt such as one of bolts 12.

Figure 10:
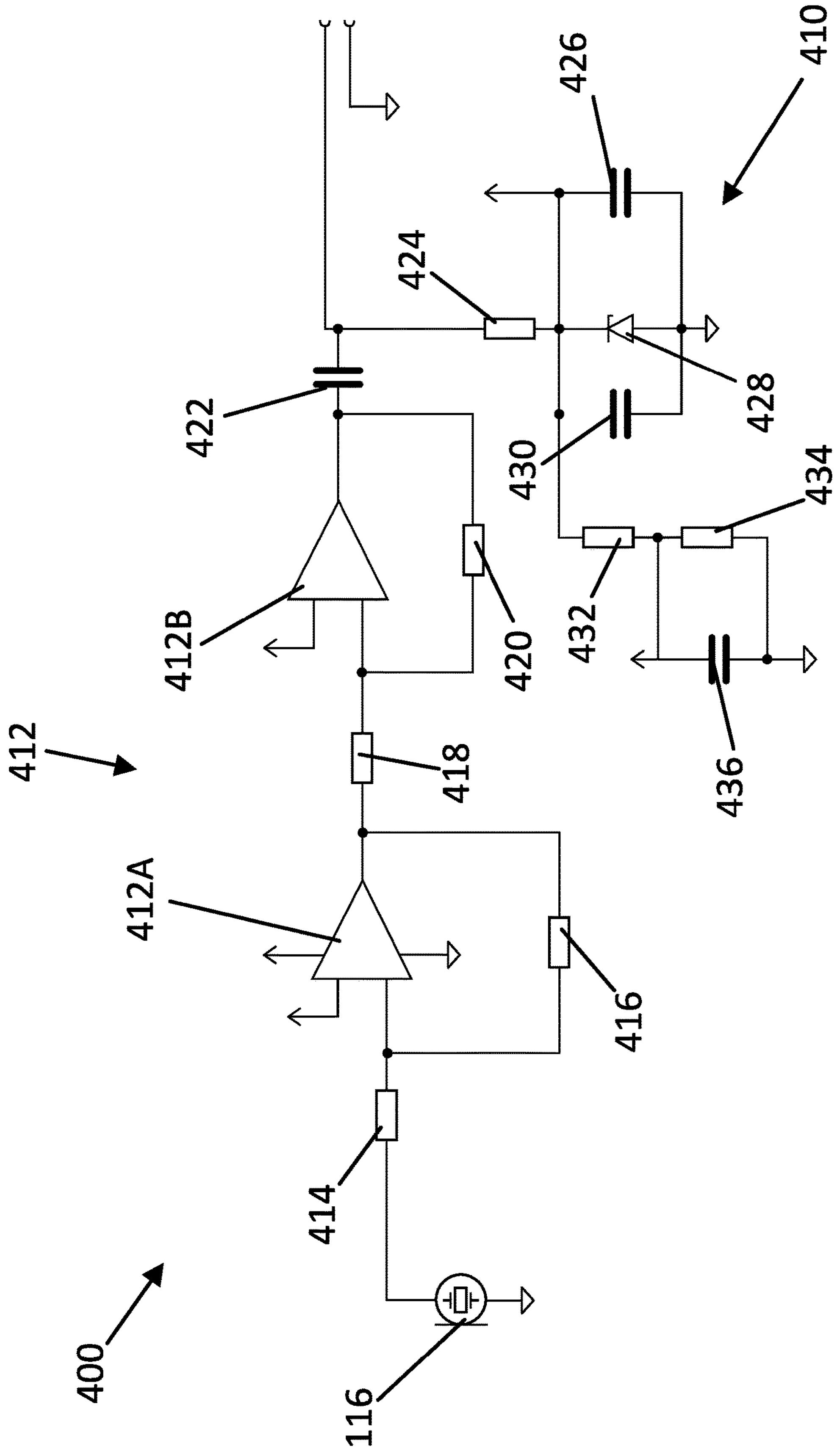
FIG. 10 illustrates an example circuitry diagram of the event monitoring sensor of FIG. 1.

FIG. 10 illustrates an example circuitry diagram of the event monitoring sensor of FIG. 1. In the illustrated embodiment, the shown circuit is distributed across PCB 140 and includes power supply circuit 410 and two-stage amplifier 412. The PCB 140 further includes capacitors 422, 426, 430, 436, diode 428, and resistors 414, 416, 418, 420, 424, 432, 434. Ultrasonic waves detected by a sensor such as sensor 116 are amplified through two-stage amplifier 412. Further, two-stage amplifier 412 is ac coupled, via capacitor 422 with the output and power supply circuit 410.

In this embodiment, power supply circuit 410 is formed from and includes capacitors 426, 430, 436, diode 428, and resistors 424, 432, and 434. These electrical components operate to supply a voltage at an adequate level such as 10 Volts (V) or 5 V. Further, a low potential state is included, and in some embodiments is at ground. Other components such as a BJT (bipolar junction transistor), MOSFET (metal-oxide-semiconductor field-effect transistor), other transistor, or an inductor may be included in other embodiments to implement a similar design.

Two-stage amplifier 412 includes amplifier 412A and amplifier 412B. These amplifiers may include transistors such as any kind of MOSFET, BJT, or JFET (junction field-effect transistor). Further, the amplifiers can be designed on an integrated circuit (IC) or application specific integrated circuit (ASIC) designed for this system. Other circuit designs to achieve the same or similar results can be implemented in a different embodiment. In other embodiments, PCB 140 is built on a chip such as an IC or ASIC that is designed to receive signals from an accelerometer or ultrasonic sensor.

Each of the resistors, capacitors, and diode may have different ratings. In the shown embodiment, resistor 414 is rated at 2.49K Ohms, resistors 416 and 420 are 100K Ohms, and resistor 418 is 1K Ohms. In addition, resistor 424 is rated at 1K Ohms, resistors 432 and 434 is 10K Ohms. Capacitors 422 and 426 are 0.1F and capacitors 430 and 436 are 10 μF. While indicated with certain values, many different combinations of resistors, capacitors, and diodes with varying resistance and capacitance can be used.

Figure 5:
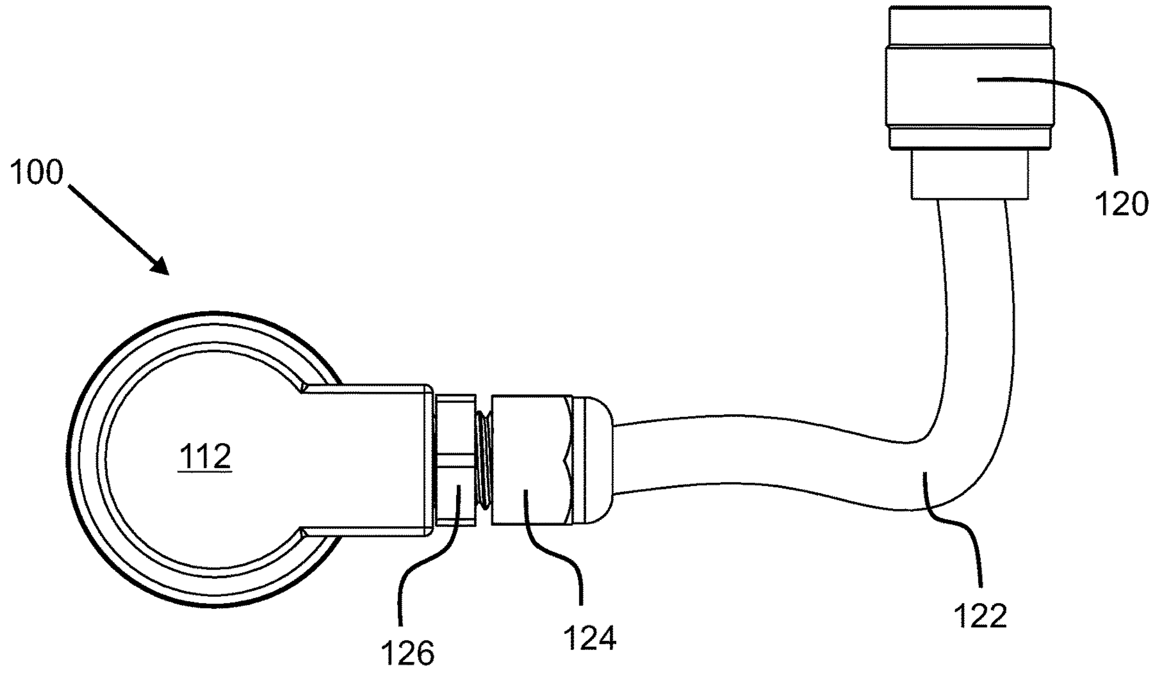
FIG. 5 illustrates an example bottom view of the event monitoring sensor of FIG. 1.
Figure 6:
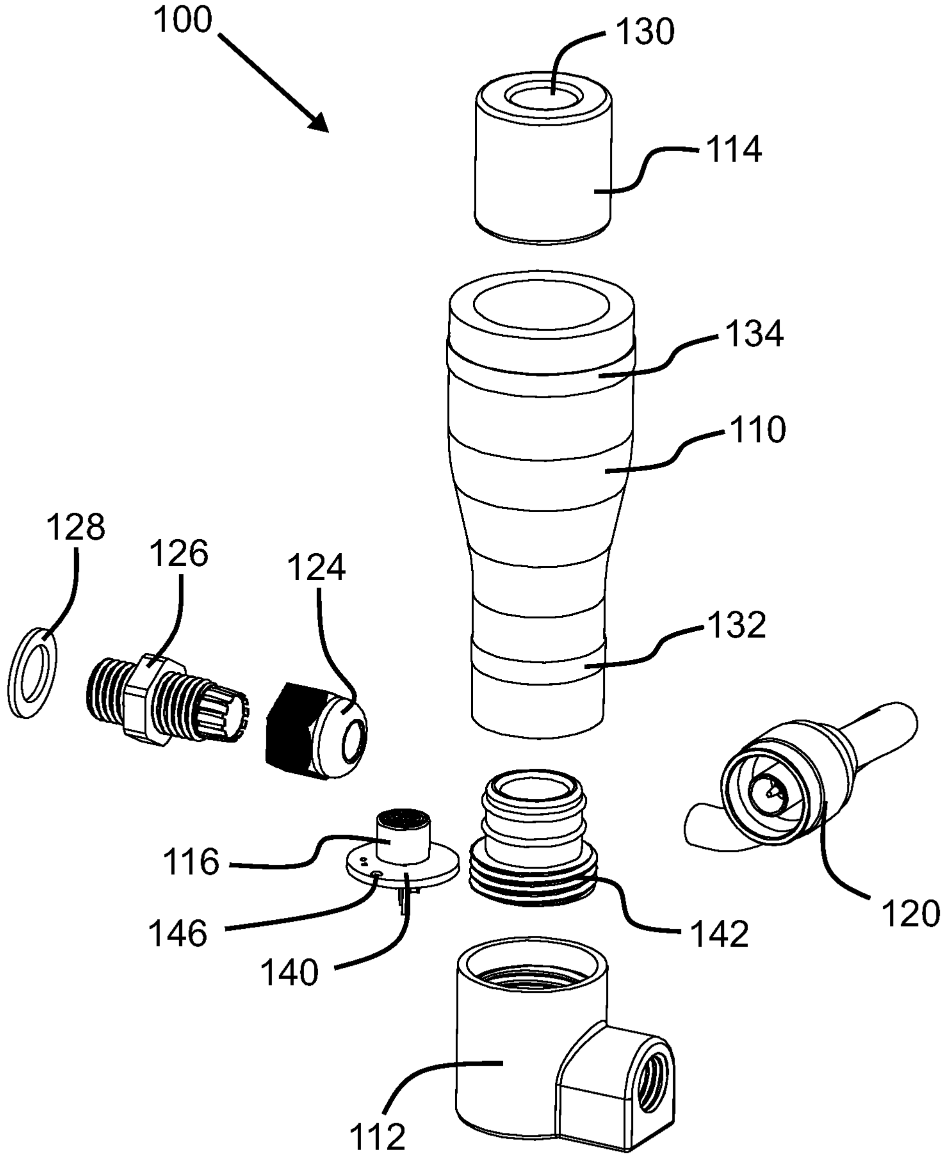
FIG. 6 illustrates an example exploded view of the event monitoring sensor of FIG. 1.

The methods and operations discussed herein are implemented using one or more computing devices. FIG. 5 is a block diagram that illustrates a computing system 500 for acting to calculate and produce the band energies EBA 710, VBA 712, and LBA 714, as well as the waveform diagram 600 discussed below in association with FIGS. 7 and 6. Illustrated is at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. A pointing device may also be connected and be a mouse, track ball, or other type of pointing device, and is used in combination with a keyboard to input data into the computing system 500. Further, a display on a mobile computing device can be touch sensitive and receive input. The graphics adapter 512 displays images and other information on the display 518. The network adapter 516 couples the computing system 500 to a network.

Figure 11:
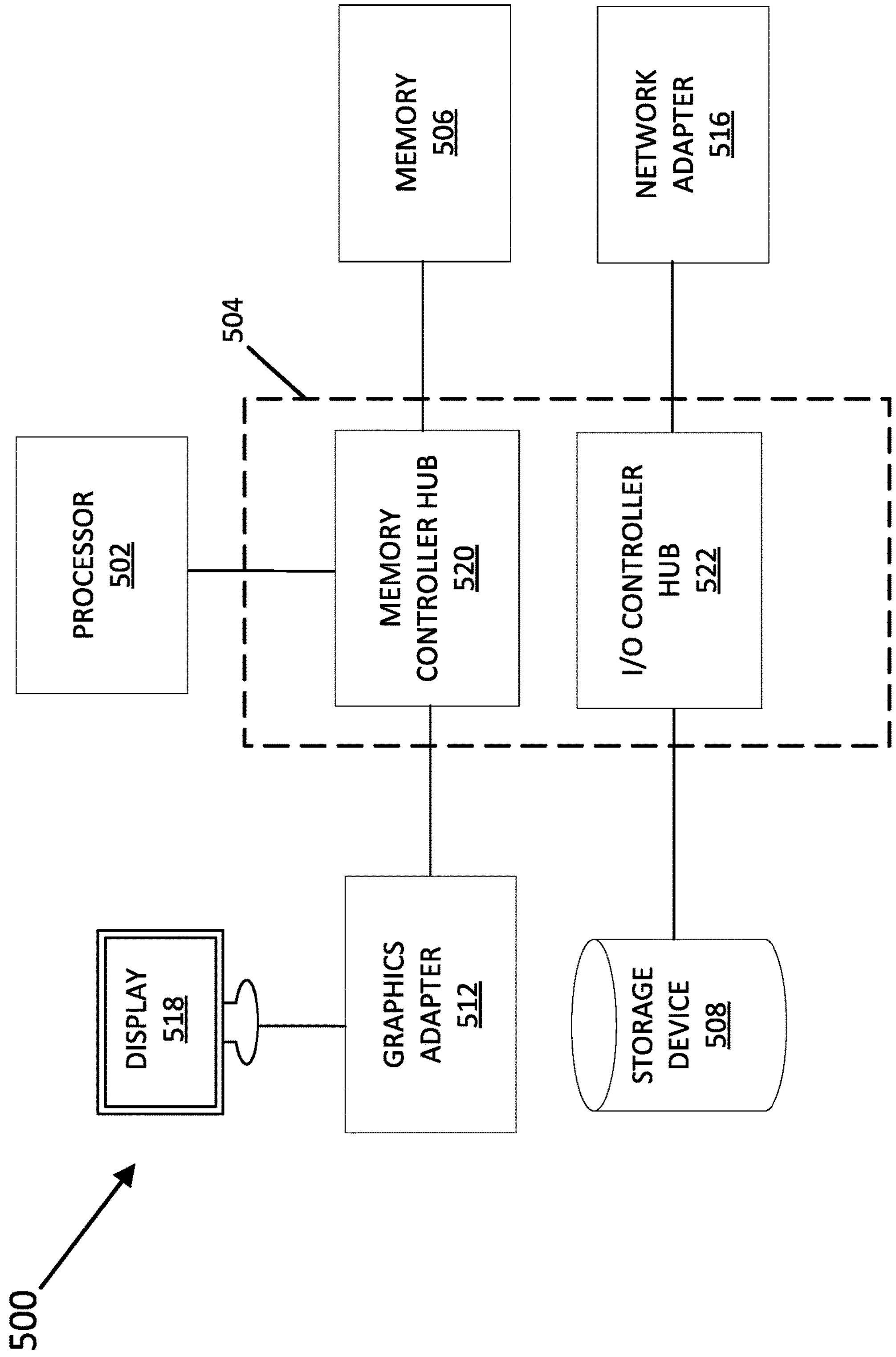
FIG. 11 illustrates an example computing system for executing methods described herein and connecting to the event monitoring sensor of FIG. 1.

As is known in the art, a computing system 500 can have different and/or other components than those shown in FIG. 11. In addition, the computing system 500 can lack certain illustrated components. For example, the computer can be formed of multiple blade servers linked together into one or more distributed systems and lack components such as keyboards and displays. Moreover, the storage device 508 can be local and/or remote from the computing system 500 (such as embodied within a storage area network (SAN)). In addition, computing system 500 can be executed on a mobile device such as a smartphone, tablet, or other computing device that is integrated into a device. Computing system 500 may be device 220 that connects to the event monitoring apparatus 100 or 200. Further, it may be integrated into the event monitoring apparatus 100 and directly connect to the sensor 116.

Figure 12:
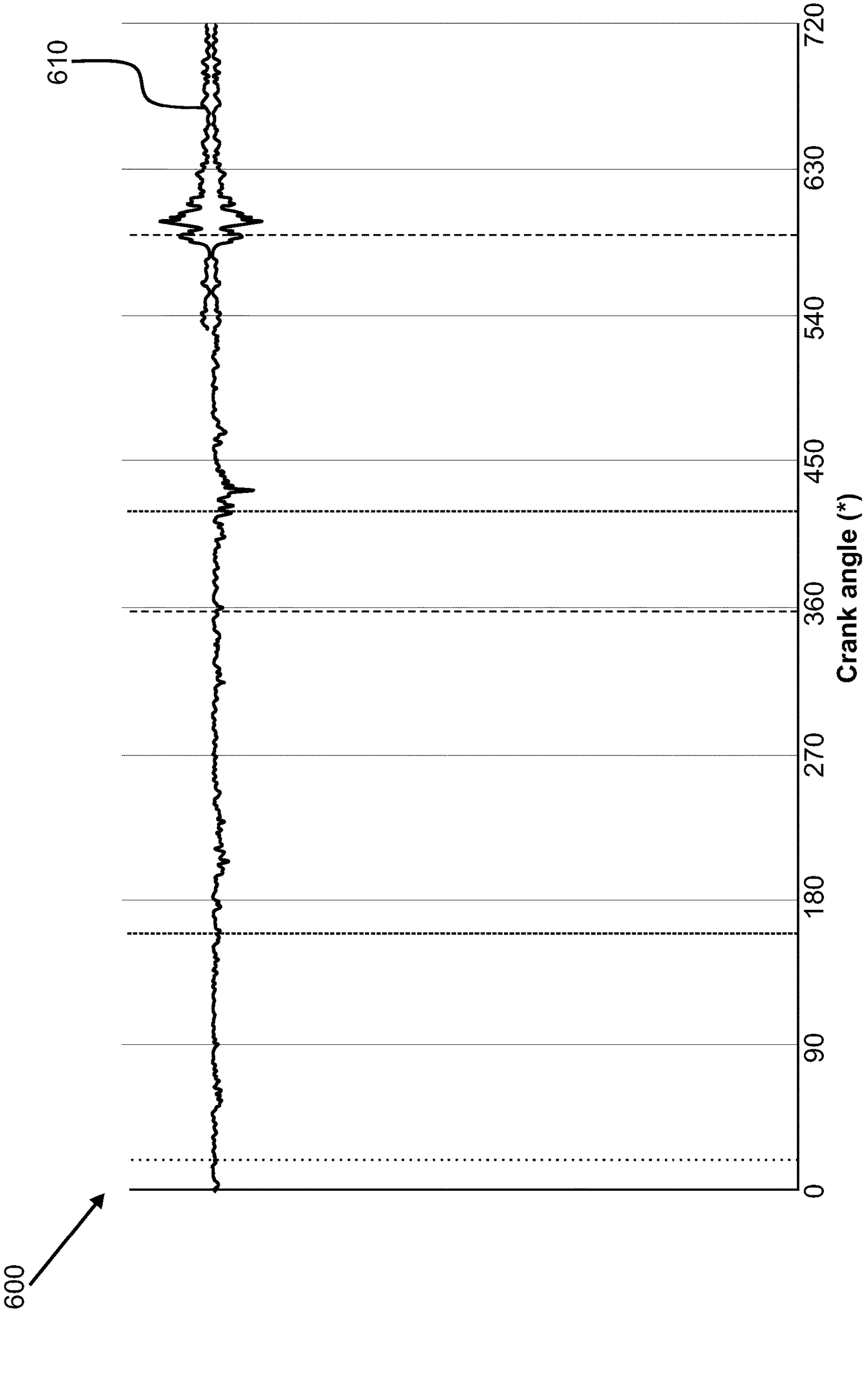
FIG. 12 illustrates an example wave form diagram captured by the event monitoring sensor of FIG. 1.

FIG. 12 illustrates an example wave form diagram captured by the event monitoring sensor of FIG. 1. In the shown embodiment, waveform diagram 600 includes waveform 610. The waveform 610 indicate detected ultrasonic waves from the vibration of the machine. Waveform 610 shows the captured power of the engine as a function of crank angle of the machine. The waveforms indicate a total cycle over a crank-angle. The crank-angle is 0 to 360 degrees for a two-stroke engine, and 0 to 720 degrees for a four-stroke engine.

To determine a fault in the machine of interest, the system will analyze the peaks of the detected band energies. Based on whether the detected peak is recorded as either early or late when compared to normal operation, the system can determine a system fault. Thus, the capturing band energy of the machine helps determine abnormalities in the machine earlier than without using a sensor. Earlier detection may help prevent catastrophic failures where the machine is out of order.

Figure 13:
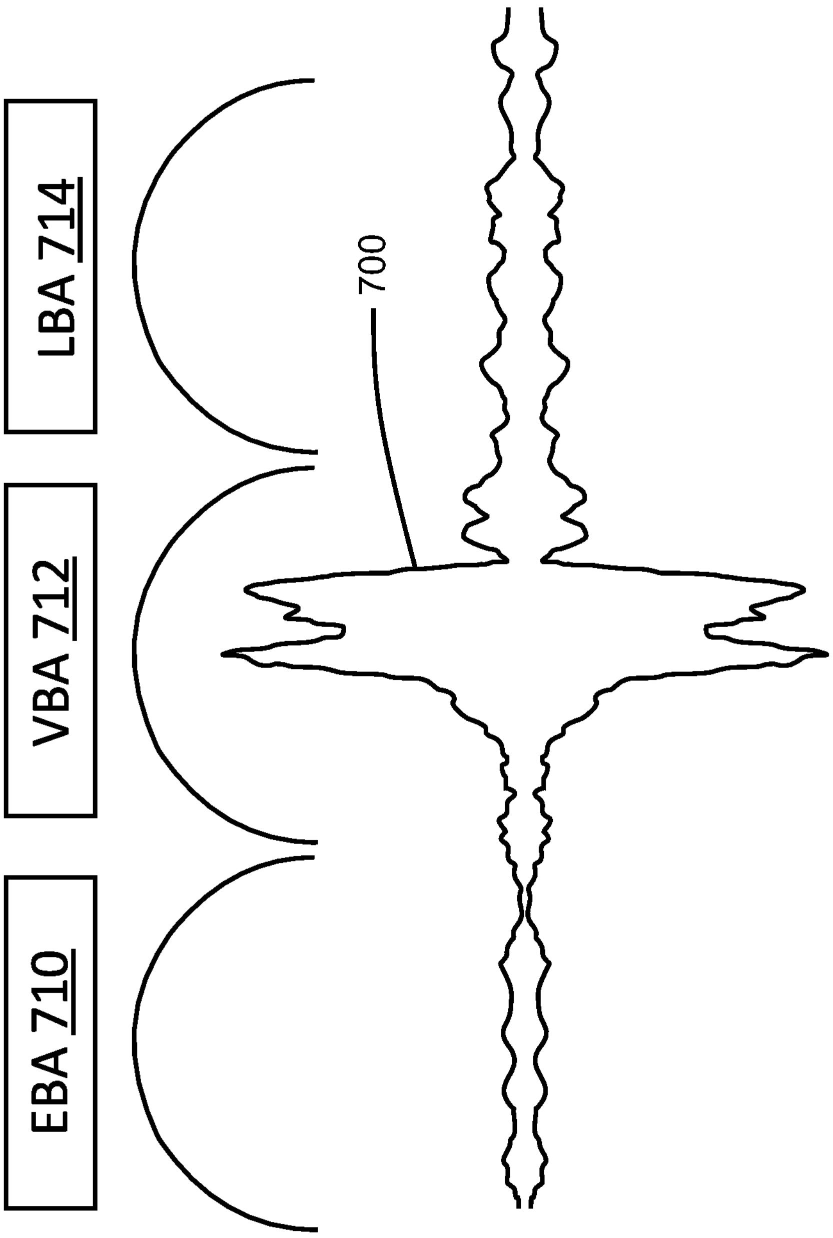
FIG. 13 illustrates an example of band areas in a wave form diagram captured by the event monitoring sensor of FIG. 1.

FIG. 13 illustrates an example of band areas in a wave form diagram captured by the event monitoring sensor of FIG. 1. In the shown embodiment, wave diagram 700 includes early band area (EBA) 710, valve band area (VBA) 712, and late band area (LBA) 714 are calculated for an observed machine event. Using the found areas, an engine error/malfunction/problem can be determined.

In this example embodiment, the band is defined as a valve event with selectable width. The area of the curve within VBA 712 is calculated and denoted by VBE (valve band energy). The total energy of the crank-angle waveform from 0 to 720 degrees (four-stroke engine) or 0 to 360 degrees (two-stroke engine) will be calculated by integrating the area under the entire curve. This will be denoted by TBE (total band energy). In this embodiment, an exhaust valve is analyzed so it is identified as VBE-exhaust.

A band earlier than the band above, such as EBA 710, will be defined as N degrees prior to the normal band. The area in this band will be calculated and denoted as EVBE (early valve band energy). Likewise a late band, such as LBA 714, is defined after VBA 712 and the area in this band is calculated by LVBE (late valve band area).

Then for each valve event a diagnostic is calculated by:

$$EVD(\text{early valve diagnostic}) = EVBE/VBE$$

$$LVD(\text{late valve diagnostic}) = LVBE/VBE$$

This ratio calculation normalizes the data so that varying amplitudes do not affect the diagnostic valves. The diagnostic values that are determined can then be compared to limits or a predetermined threshold to alert the user of valve problems. Any number of additional bands can be defined within the total crank-angle for other embodiments. For example, a band from 0 to 40 degrees for injector energy. This band energy will be ratioed to the total band energy to come up with a diagnostic value for the injector energy, such as InjectorED (for injector event diagnostic). Then this diagnostic will be compared to provide a warning to the user of an abnormal condition.

Figure 14:
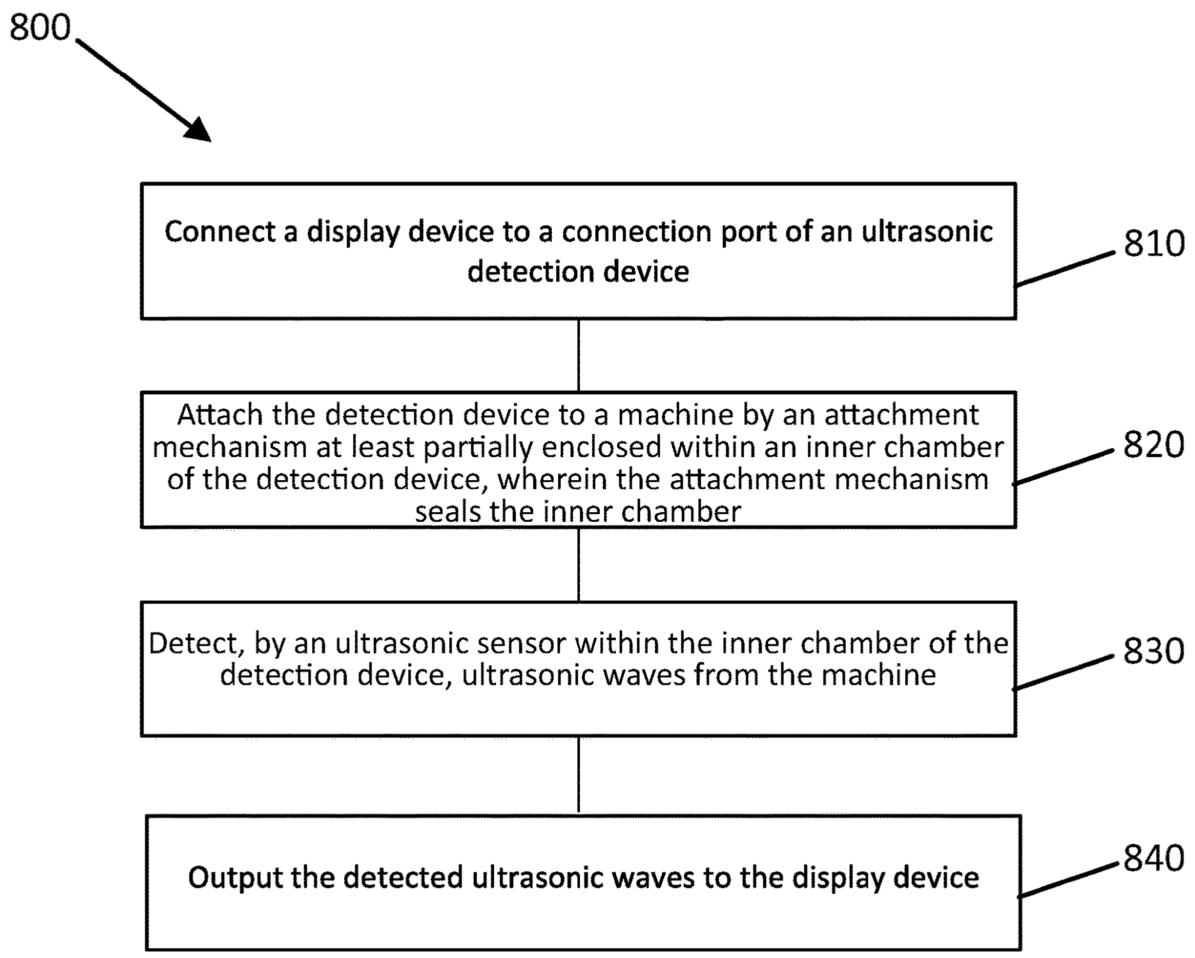
FIG. 14 illustrates an example method for using the event monitoring sensor of FIG. 1.

FIG. 14 illustrates an example method for using the event monitoring sensor of FIG. 1. Method 1300 includes operations that may be implemented by a device such as event monitoring apparatus 100 or computing system 500. Operations 810-840 are described for example purposes, and no particular order is required. Further, other operations can be added as well.

At operation 810, a display device is communicatively connected to a connection port of an detection device. In some embodiments, the connection port can be connection port 120 or 218. Further, the display device is device 220 in some embodiments. In one embodiment, the detection device is event monitoring apparatus 100 and electrically connects to the display device. In other embodiments, the display device may be a general computing device instead.

At operation 820, the detection device is attached to a machine by an attachment mechanism at least partially enclosed within an inner chamber of the detection device, wherein the attachment mechanism seals the inner chamber. In some embodiments, the inner chamber is inner chamber 144 of the event monitoring apparatus 100. In some embodiments, the attachment mechanism is attachment mechanism 114 and attaches to a reciprocating machine's surface. This operation is accomplished by magnetically attaching the device in some embodiments. In others, the attachment mechanism uses an opening to enclose a protruding bolt and magnetically attach to the machine. External acoustic wave noise is also filtered out by the detection device. An outer housing, such as outer housing 110, may be used and made of a material to insulate the inner chamber from external acoustic sound waves. In some embodiments, the attachment mechanism is a solid magnet without an opening, thus, the inner chamber is already sealed.

At operation 830, the detection device detects ultrasonic waves from the machine. A sensor, such as sensor 116, may be used to sense or detect these waves emitted by the vibrations of the machine of interest. The ultrasonic waves are then converted to electrical signals. The electrical signal may include digital data or an analog signal.

At operation 840, the detected ultrasonic waves are outputted or sent to the display device. This step may include utilizing PCB 140 to amplify and send the ultrasonic waves to the display device. These may be over a wired ICP connection, USB connection, or a wireless communication method as previously discussed.

Other operations may be included as well. For example, the detected ultrasonic waves may be displayed on a display device such as a tablet or smart phone. This step may take the form of displaying waveforms that represent the ultrasonic waves from the machine. In other embodiments, the system may calculate different band energies, diagnostics, and predetermined thresholds as illustrated in FIG. 7 and discussed below. The method then may include indicating a machine or engine error based on these calculations.

Referring to FIGS. 1-13, generally, in some example aspects described herein "removably attached" or "removably connected" is defined as attaching in a way that allows for later removal. Further, "electrically connects" is defined as connecting to allow the transfer of electrical signals and can take the form of continuous analog signals, digital data, or continuous stream of current. Additionally, "magnetically connects" or "magnetically attach" is defined as using the principles of magnetism to attach. Further, "communicatively connected" is defined as connecting so data can be exchanged over the connection including over a wireless connection or a wired connection.

In one example, a sensing apparatus for detecting ultrasonic waves from a vibration-generating machine comprises a housing, an inner chamber within the housing, a sensor at a first position of the inner chamber. The sensor detects ultrasonic waves and converts the ultrasonic waves to electrical signals. The apparatus further comprises an electrical connection that electrically connects to the sensor and outputs the electrical signals from the sensor, and an attachment mechanism at least partially enclosed within the inner chamber and located at a second position of the inner chamber. The attachment mechanism is removably attachable to a machine to seal the inner chamber from external noise.

In other examples, the attachment mechanism is a magnet. In other examples, the magnet includes an opening. In other examples, the housing is made of silicone rubber. In other examples, the housing has a honeycomb internal structure. In other examples, the opening is configured to encompass a nut, bolt, or screw on the machine. In other examples, electrical connection is an integrated circuit piezoelectric (ICP) interface. In other examples, the sensing apparatus further comprises a display device connected to the connection port. In other examples, the housing is made of silicone rubber. In other examples, the housing shields the inner chamber from external noise. In other examples, the sensor is configured to be replaced with an accelerometer.

In another example, a method for detecting ultrasonic waves from a machine comprises communicatively connecting a display device to a connection port of a detection device, attaching the detection device to a machine by an attachment mechanism at least partially enclosed within an inner chamber of the detection device. The attachment mechanism seals the inner chamber. The method also includes detecting, by a sensor within the inner chamber of the detection device, ultrasonic waves from the machine, and outputting the ultrasonic waves to the display device.

In other examples, attaching the detection device includes using a magnet within the detection device to magnetically attach to the machine. In other examples, wherein attaching the detection device includes fitting an opening of the magnet to a bolt. In other examples, the method further comprises displaying waveforms of the ultrasonic waves on the display device. In other examples, the method further comprises calculating a valve band energy, an early valve band energy, and a late valve band energy. In other examples, the method further comprises calculating an early valve diagnostic using the early valve band energy; determining the early valve diagnostic meets a predetermined threshold; and in response to determining the early valve diagnostic meets the predetermined threshold, indicating an error. In other examples, the method further comprises calculating a late valve diagnostic using the late valve band energy; determining the late valve diagnostic meets a second predetermined threshold; and in response to determining the late valve diagnostic meets the second predetermined threshold, indicating an engine error. In other examples, calculating the valve band energy includes integrating a valve band area, and calculating the early valve band energy includes integrating an early valve band area, and calculating the late valve band energy includes integrating a late band area.

In an additional example, a system for machine diagnostics comprises a machine with an engine that causes the machine to vibrate, a sensing apparatus attached to the machine, the sensing apparatus comprising a housing. The apparatus further comprises an inner chamber within the housing, a sensor at a first position of the inner chamber. The sensor detects ultrasonic waves and converts the detected ultrasonic waves to electrical signals, an electrical connection. The electrical connection electrically connects to the sensor and outputs the electrical signals, and an attachment mechanism at least partially enclosed within the inner chamber and located at a second position of the inner chamber. The attachment mechanism is removably attachable to the machine to seal the inner chamber from external noise.

In other examples, the attachment mechanism includes a magnet. In other examples, the magnet includes an opening. In other examples, the housing is made of silicone rubber. In other examples, the housing has a honeycomb internal structure. In other examples, the attachment mechanism includes an opening configured to enclose a nut or bolt on the machine. In other examples, the connection port is an integrated circuit piezoelectric (ICP) interface. In other examples, the system further comprises a display device connected to the electrical connection. In other examples, the attachment mechanism creates an acoustic seal in the inner chamber between the attachment mechanism and the second position of the inner chamber. In other examples, wherein the attachment mechanism creates an acoustic seal in the inner chamber between the attachment mechanism and the second position of the inner chamber. In other examples, the sensor includes a piezoelectric crystal transducer. In other examples, the connection port includes a multi-pin connector. In other examples, the sensor is configured to be replaced with an accelerometer.

The present disclosure is not to be limited in terms of the particular embodiments described in this application, which are intended as illustrations of various aspects. Many modifications and variations can be made without departing from its spirit and scope. Functionally equivalent methods and systems within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

Since many embodiments of the present disclosure can be made without departing from the spirit and scope of the disclosure, the invention resides in the claims hereinafter appended.

What is claimed is:

1. A sensing apparatus for detecting ultrasonic waves from a vibration-generating machine, the sensing apparatus comprising:

a housing;

an inner chamber within the housing;

a sensor at a first position of the inner chamber, wherein the sensor is configured to detect ultrasonic waves and convert the ultrasonic waves to electrical signals;

an electrical connection that electrically connects to the sensor and is configured to output the electrical signals from the sensor; and a magnet at least partially enclosed within the inner chamber and located at a second position of the inner chamber opposite the first position, wherein the magnet is configured to removably attach to a machine to acoustically seal the inner chamber from external noise through a direct attachment to a surface of the machine.

2. The sensing apparatus of claim 1, wherein the magnet includes an opening.

3. The sensing apparatus of claim 2, wherein the opening is configured to encompass a nut, bolt, or screw on the machine.

4. The sensing apparatus of claim 1, wherein the housing is made of silicone rubber.

5. The sensing apparatus of claim 1, wherein the housing is configured to shield the inner chamber from external noise.

6. The sensing apparatus of claim 1, wherein the electrical connection is an integrated circuit piezoelectric (ICP) interface.

7. The sensing apparatus of claim 1, further comprising a display device connected to the electrical connection.

8. A system for machine diagnostics comprising:

a machine with an engine that is configured to cause the machine to vibrate;

a sensing apparatus attached to the machine, the sensing apparatus comprising:

a housing;

an inner chamber within the housing;

a sensor at a first position of the inner chamber, wherein the sensor is configured to detect ultrasonic waves and convert the ultrasonic waves to electrical signals;

an electrical connection that electrically connects to the sensor and is configured to output the electrical signals; and a magnet at least partially enclosed within the inner chamber and located at a second position of the inner chamber opposite the first position, wherein the magnet is configured to removably attach to a machine to acoustically seal the inner chamber from external noise through a direct attachment to a surface of the machine.

9. The system of claim 8, wherein the magnet includes an opening.

10. The system of claim 8, wherein the housing is made of silicone rubber.

* * * * *